United States Patent [19]

Yoneda et al.

[11] 4,330,838

[45] May 18, 1982

[54] ELEVATOR TEST OPERATION APPARATUS

[75] Inventors: Kenji Yoneda; Masao Nakazato; Takeo Yuminaka; Kazuhiro Sakata, all of Katsuta; Soshiro Kuzunuki, Hitachi, all of Japan

[73] Assignee: Hitachi, Ltd., Tokyo, Japan

[21] Appl. No.: 56,149

[22] Filed: Jul. 9, 1979

[30] Foreign Application Priority Data

Jul. 7, 1978 [JP] Japan ................................. 53-82042

[51] Int. Cl.[3] ......................... B66B 3/00; G06F 15/20

[52] U.S. Cl. .................................... 364/580; 364/300; 364/426; 187/29 R

[58] Field of Search ............... 364/550, 580, 579, 426, 364/424, 300, 200; 187/29 R; 371/20

[56] References Cited

U.S. PATENT DOCUMENTS

| | | | |
|---|---|---|---|
| 3,851,735 | 12/1974 | Winkler et al. | 187/29 R |
| 3,973,648 | 8/1976 | Hummert et al. | 187/29 R |
| 4,106,593 | 8/1978 | Otto | 187/29 R |
| 4,115,847 | 9/1978 | Osder et al. | 371/20 X |
| 4,155,116 | 5/1979 | Twwfik et al. | 364/579 X |
| 4,162,396 | 7/1979 | Howard et al. | 371/20 |
| 4,209,833 | 6/1980 | Krupp et al. | 364/569 |

*Primary Examiner*—Edward J. Wise
*Attorney, Agent, or Firm*—Craig and Antonelli

[57] ABSTRACT

An elevator test operation apparatus for a multi-floor service elevator comprises a digital computer for processing an elevator control signal. The digital computer is provided with means for storing an elevator operation control program, and interface means for transferring a signal from an elevator control system to the digital computer or transferring a signal from the digital computer to the elevator control system, thereby to process the signal from the elevator control system in accordance with said elevator operation control program. The elevator test operation system further comprises means operated by maintenance personnel in a test operation and generating test signals such as a command for establishing an elevator car weight and a command for shortening a period of time when an elevator door is opened, and interface means for supplying those test signals to the digital computer, wherein the digital computer further comprises means for storing various programs for shortening the opening time of the elevator door during test operation and for establishing the elevator car weight, and a test operation program thereby to execute the test operation program in accordance with the test operation signal.

16 Claims, 19 Drawing Figures

ELEVATOR TEST OPERATION APPARATUS

This invention relates to a test system for an elevator, and more particularly to an elevator test operation apparatus in which a digital computer is used for processing an elevator control signal in the signal control section of the elevator.

With the recent remarkable progress in semiconductor integrated circuit techniques, the degree of integration of integrated circuits has been increased from MSI to LSI, so that a small digital computer, a so-called microcomputer, has been widely used in various industrial products because of their small size, low cost, high performance, and low power consumption.

A microcomputer usually comprises an MPU (microprocesser unit), ROM (read-only memory), RAM (random access memory), I/O port (input/output port), and so forth. Those elements are not only produced at low cost, but also a microprocessor formed on a single chip, a so-called one-chip MPU, is available in the market.

Such microcomputers are suitable for controlling elevators. The conventional elevator control was performed by using relays as a main component, and the number of the relays used was in the hundreds, and therefore the elevator control system has become bulky and has been beset with many other problems such as increased complexity of the relay sequence, limited improvement of performance, and restricted expansibility. However, those problems may be solved by applying a microcomputer to the elevator control system and also the reliability of the signal control section may be improved.

In an elevator system, there are various mechanical switches, and electrical apparatus for driving an elevator car, a protection device, and the like which are located in the elevator car, a hatchway, a machine room, landing floors and the like. Therefore, the overall failure rate in the elevator system will not be reduced even if a microcomputer is utilized for the signal control section of the elevator system.

Thus, monitoring of control status is still required in this type of elevator system, as in the conventional elevator system using relays. In addition, a test operation is required upon installation of the elevator system and is also required for alignment, inspection, maintenance, and the like as the case may be after that.

With the conventional relay circuit, the operation of an elevator system is monitored by checking on and off operations of relays. In such arrangement using a microcomputer, however, it was impossible to check the operation sequence, although it was considered to overcome such a problem by displaying the microcomputer control data on a cathode ray display device, as described in U.S. Pat. No. 3,973,648.

With the conventional relay circuit, the test operations have been performed by temporarily energizing relays by hand or continuously energizing relays with clips. In the elevator system using a microcomputer, however, there are few points which may be tested by the conventional method and, therefore, neither alignment, inspection nor maintenance may be sufficiently performed. Thus, it is desired to provide a test system for elevator systems. The above-described test method for the conventional relay circuit has disadvantages, listed below, which are also desired to be eliminated.

(1) Assurance of Safety:

As described above, since the test operation is performed by continuously energizing or deenergizing the conventional relays with clips, there is such possibility that abnormal conditions may occur during the regular service of the elevator if the clips remain unremoved.

(2) Improvement of Accuracy:

The conventional test operation was limited to the extent of manually energizing the relays, and therefore it was difficult to test the overall control system.

(3) Simplicity of Test Operation:

Skilled maintenance personnel and the like as well as a long period of time were required for the conventional test operation. Such a disadvantage was more remarkable in test operation for an elevator group control system in which plural elevators are operated in parallel.

The U.S. Pat. No. 3,973,648 (the above-mentioned Japanese patent laid-open publication No. 60354/76) also describes a method of monitoring the operation of a microcomputer for processing an elevator control signal while testing the performance of the microcomputer. According to the above-mentioned U.S. patent, a central monitoring system is provided with a monitoring computer supplied with a elevator control data and the digital computer for processing the elevator control signal. Thus, the operations of the two computers are compared to check the performance of the digital computer for processing the elevator control signal. This method requires a relatively large monitoring computer. This causes no problem with the centralized monitoring of the elevator system but is unsuitable for testing or alignment conducted at the location of the elevator installation. In addition, the registration of calls is required for elevator operation and thus this monitoring system requires monitoring and maintenance control means comprising signal decoder means and the like in order to register calls. Such signal decoder means is needed for each data to be supplied to the elevator control signal processing computer. This not only limits the amount of data to be supplied to the elevator control signal processing computer, but also makes the system expensive. In addition, once such data is stored in the elevator control signal processing computer, the elevator system can only be operated in accordance with the stored program which is not necessarily suitable for alignment or maintenance conducted at the site of the elevator installation. As described above, the system according to the above-described U.S. patent is intended for use in the central monitoring room. The system is not suitable for use of alignment and maintenance conducted at the site of the elevator installation and also is expensive.

It is an object of the invention to provide an elevator test operation apparatus including a digital computer for processing an elevator control signal, which permits various test operations without any expensive devices.

It is another object of the invention to provide a high-safety apparatus for elevator test operation.

According to the present invention, an elevator control signal processing digital computer comprises test operation programs and means for storing these programs, and in accordance with a test signal produced from a test operation signal generator device connected to the digital computer, the test operation programs are executed to perform the test operation.

Also, according to the present invention, the elevator control signal processing computer determines that the function of the above-mentioned test operation signal generator device has stopped, so that the elevator operation may be automatically restored to its usual operation.

Other objects and features of the invention will be apparent from the following description. The present invention will be described by way of preferred embodiments of the invention in conjunction with the accompanying drawings in which.

Now, the present invention is described in detail by way of one embodiment thereof illustrated in the accompanying drawings. In this embodiment, it is assumed that a first and a second elevator are controlled in a group and individual microcomputers are provided for processing signals for controlling the first elevator, the second elevator and a group control portion. The test operation signal generator device will be hereinafter referred to as a test device. The test device is arranged to generate test operation signals as well as to display the signal received from the elevator control signal processing microcomputer for monitoring. However, the test device may be arranged only to generate test operation signals.

Figure 1:
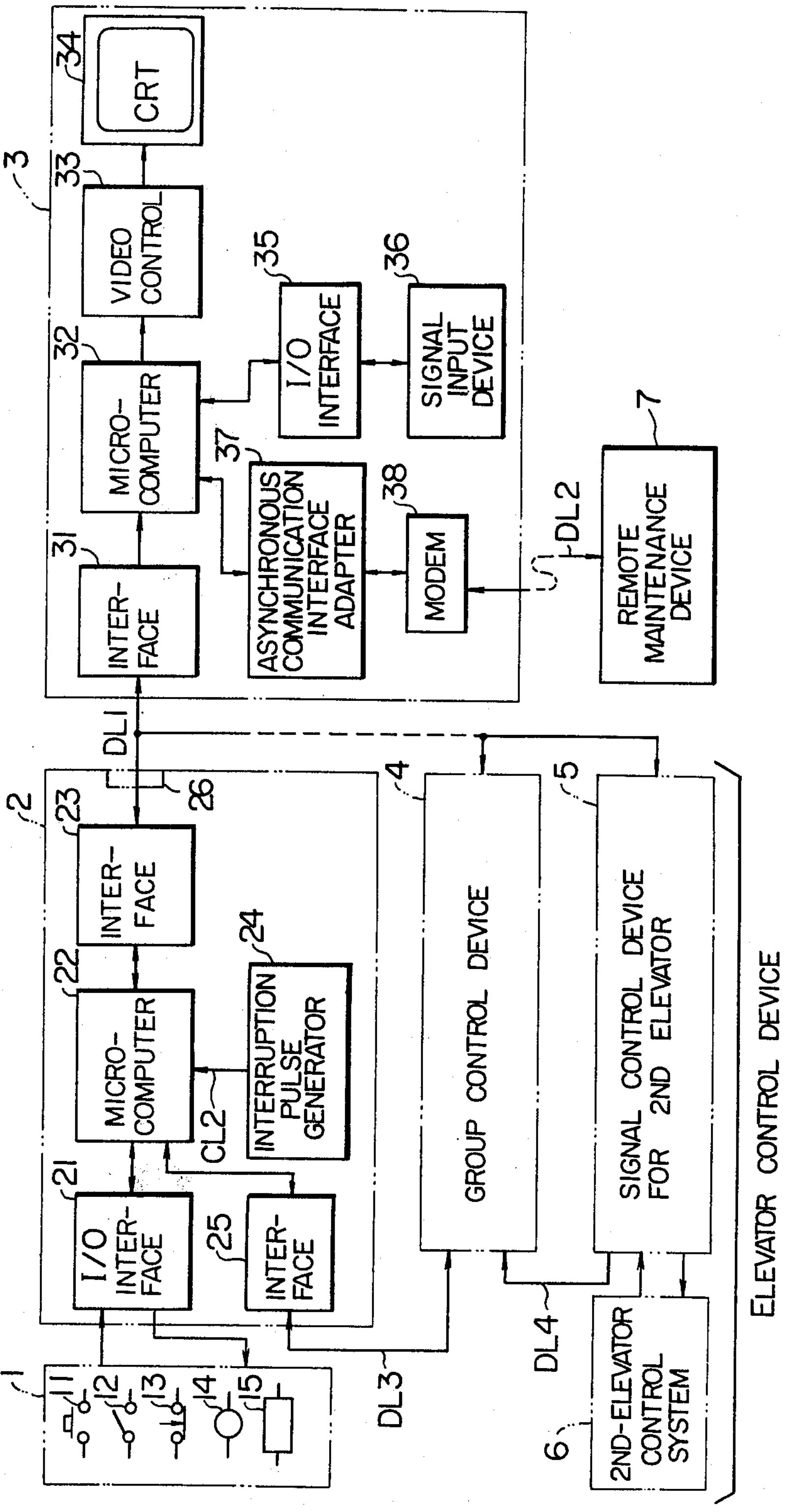
FIG. 1 shows a block diagram of an entire arrangement of one embodiment in accordance with the present invention.

FIG. 1 shows a block diagram of an entire arrangement according to one embodiment of the present invention. An elevator control unit 1 for the first elevator comprises a control circuit 15 including relays used for safety and to form the elevator drive sequence, a pushbutton 11 for car calls, a switch 12 for selection of operation, limit switches 13 for checking the elevator for safety, and an indicator 14 such as a lamp or the like responsive to a car call, all of these components being well-known.

A signal control device 2 for the first elevator comprises an input/output interface circuit 21 connected to the elevator control unit 1, a microcomputer 22 for signal processing, an interruption pulse generator circuit 24 for generating an interruption pulse for periodically interrupting the microcomputer 22 and executing the elevator operation control program PGM2, an interface circuit 23 for transmitting and receiving to/from a signal line $DL_1$ the data for test operation control according to this invention as well as the contents in the elevator control data table, and an interface circuit 25 for transmitting and receiving the data to/from a group control device 4.

A test device 3 comprises an interface circuit 31 for transmitting and receiving the data to/from the elevator signal control device 2, a microcomputer 32, a display device 34, such as a cathode ray tube or the like, for displaying data received from the elevator signal control device 2 and so forth and information convenient to operate the test device 3, a video control circuit 33 for supplying display signals to the display device 34, a signal input/output device 36 including a keyboard and a cassette tape recorder, an input/output interface circuit 35 between the signal input/output device 36 and the microcomputer 32, a modem 38 for communication between the test device 3 and a remote maintenance device 7, and an input/output interface 37 between the modem 38 and the microcomputer 32.

An elevator control system 6 for the second elevator and an elevator signal control device 5 for the second elevator have the same arrangement as those for the first elevator, and they are connected to the test device 3 through the signal line $DL_1$. In the respect of hardware, the group control device 4 is different from the elevator signal control device 2 for the first elevator in that it does not include the corresponding circuit to the input/output interface circuit 21. However, the group control device 4 includes an interface circuit for the elevator signal control device 5 for the second elevator, and will include additional interface circuits in the case where the group control device 4 controls other plural elevators than those two elevators. In the other respect, the group control device 4 is of the same structure as the elevator signal control device 2.

The microcomputer signal processing program will be described below. However, as those who are skilled in this field of art can readily understand how the present invention is applied to the group control device 4, the specific description with respect to the group control programs will be omitted herein.

The elevator control units 1 and 6 and the elevator signal control devices 2 and 5, which form part of the elevator control system, need not be structured as described above. For example, an alternative arrangement may be used wherein the group control device 4 is omitted and the control process is performed by the elevator control devices 2 and 5 alone without use of the group control device 4.

The signal lines $DL_1$, $DL_3$, and $DL_4$ may be used in common, but for the purpose of better understanding of the present invention, these lines are each illustrated herein as a discrete line. The microcomputer 32 is used for the test device in this embodiment for a wide range of maintenance, but a more simple arrangement may be used in which the signal input/output device 36 is directly connected to the interface circuit 23. Thus, the structure of the test device 3 is not restricted as long as it provides the test operation signal as described above.

Now, the general operation of the arrangement of the present invention is described in conjunction with FIG. 1. In the elevator signal control device 2, the input/output interface circuit 21 receives control input signals from the buttons 11 including hall call buttons in the halls, destination buttons in the cars (called car call buttons hereinafter) and door actuator buttons on the operation panel in the cars, and supplies the control signals to the microcomputer 22. The microcomputer 22 initiates the elevator control program in response to pulses generated at shorter intervals than usual by the interruption pulse generator circuit 24, controls the elevator so as to more efficiently and safely conduct a car and a hall call service, and selectively drives the control circuit 15 and lamps 14 in the elevator control unit 1 through the input/output interface circuit 21.

If all of the elevator control device and the elevator drive mechanism normally operate, the signal input/output interface circuit 23 according to the present invention will not be needed. However, there is the possibility that various kinds of troubles will occur several times a year in any elevator system as described above.

Therefore, a monitoring board or the like for displaying necessary monitoring information and for alarms is still required as well as the monitoring personnel who always monitor the elevator conditions.

The test device 3 shown in FIG. 1 has the function of such a monitoring board in which the elevator control information from the microcomputer 22 is supplied to the microcomputer 32 through the interface circuit 23, the signal line $DL_1$, and the interface circuit 31. Thus, the test device 3 checks the trouble with the elevator operation in accordance with the information received from the microcomputer 22, and allows the monitoring personnel to learn the result through the cathode ray tube 34; the service status if the elevator operation is normal; and the symptom and corrective procedure if any trouble occurs.

Recently, a centralized monitoring system in a maintenance center is desired, in order to improve maintenance service. In this case, the modem 38 is used to control the communication with the remote maintenance device 7 located in the maintenance center of a maintenance company. If the communication is needed only when trouble is found by the microcomputer 32 or when the maintenance center asks for confirmation, then a telephone network control device (hereinafter abbreviated as NCU) may be added to the modem 38, so that an inexpensive subscriber's telephone line may be used for data transmission.

Besides the monitoring function, the feature of the present invention resides in the test operation function which is required when a microcomputer is used for the elevator control device.

An efficient and reliable test device is desired to check the service function and the group control operation in a regular inspection as well as to conduct the test operation and the alignment operation upon completion of elevator installation.

For instance, it is required to check the burnout of the elevator position indicator lamps at each floor by keeping car calls registered at both top and bottom floors, the full load sequence by establishing a given weight of car, and the traffic detecting function which is needed for group controlled elevators.

Test operation signals for such checks may be supplied to the microcomputer 32 through the signal input/output device 36. For automatic testing, a cassette tape recorder may be used to introduce input signals into the microcomputer 32, thus permitting the maintenance personnel to concentrate his attention on the cathode ray tube so as to check more efficiently. When the microcomputer 32 has surplus capacity, trouble shooting and determination of whether the elevator is operating properly or not may be made based on the proper operation mode information obtained from the cassette tape.

In order to obtain the necessary test function for monitoring and maintenance, according to the present invention, the microcomputer 22 which forms a main part of the elevator signal control device 2, is provided with a program for executing the test operation by receiving a signal from the test device 3, and means for storing the program, and connected to the test device through the input/output interface circuit 23 to the test device 3.

According to the above embodiment illustrated in FIG. 1, it is unnecessary to provide an individual output circuit for every signal to be displayed for indication of sequence status. Furthermore it is unnecessary to provide any particular input circuit associated with a particular control input signal necessary for test operation of elevators, and also it is unnecessary to provide any means for serially coupling a signal from a particular test control signal generator (e.g. call button) with the control signal line associated with the elevator control unit 1, or switching the signal, or coupling the signal in parallel thereto.

Thus, the embodiment shown in FIG. 1 has the following advantages.

(1) Since the code signal interface circuit 23 applicable to a multipurpose input/output means allows the microcomputer 22 to connect with the test device 3 by way of a small number of the signal lines $DL_1$ the test device 3 and the elevator signal control device 2 need not be installed in one cubicle and the test device 3 may be formed such that it has a single cable of the signal line $DL_1$ and is a detachable device which is easy to carry. If a drive voltage level for the code signal interface circuit 23 is increased to increase a noise margin, the test device 3 may be placed at a distance of several hundred meters. Thus, the test device 3 may be carried to any place in the machine room or management room of the building, or into/onto any elevator car, so that trouble shooting and repair work may be performed efficiently. In addition, the test device 3 may be used in common to a number of elevator cars.

(2) The test device 3 may be provided with a test keyboard only, or may be provided with the microcomputer 32 and the modem 38 so as to allow the elevator control device to have improved monitoring and testing functions.

These may be realized by addition or modification of part of the program for the test device 3 and microcomputer 22. This permits improvement of the test device to be made easily after installation.

One embodiment of the invention and the effect thereof has generally been described above. A particular embodiment of the invention will be described below with reference to FIGS. 2 to 20.

Figure 2:
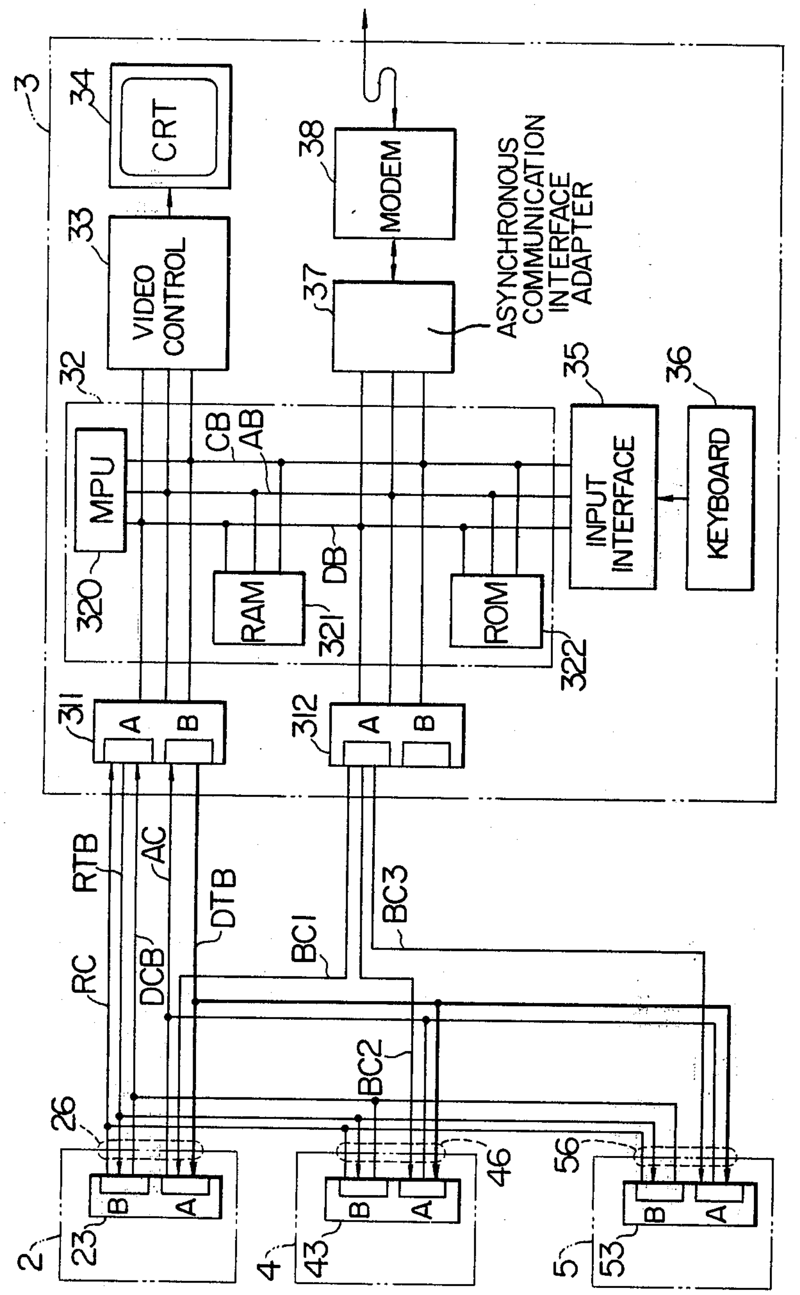
FIG. 2 shows a block diagram illustrating the detailed relationship between a test device including test signal generator means and an elevator signal controlling device according to the present invention.

FIG. 2 is a circuit diagram of the test device 3 according to the present invention, for illustrating the relationship between the code signal interface circuit 23 and the test device. The microcomputer 32 comprises a microprocessor (MPU) 320, a random access memory (RAM) 321 and read-only memory (ROM) 322. The MPU 320 is connected to an address bus AB, a data bus DB and a control bus CB. These buses also connect the RAM 321 and the ROM 322. The RAM 321 is adapted to store signals supplied from devices such as the elevator signal control device 2 as well as signals supplied from the keyboard 36 which is a kind of a signal input device, while ROM 322 is adapted to store the program for execution of various functions of the test device 3. Also connected to these buses are peripheral interface adapters (hereinafter abbreviated as PIA) 311 and 312, a video control circuit 33 for supplying indication signals to the cathode ray tube 34, and an asynchronous communication interface adapter (hereinafter abbreviated as ACIA) 37 for providing interface to the modem 38.

The microcomputer 22 has the same configuration as the microcomputer 32, and the PIA 23 for interfacing code signals is connected to the above-mentioned three buses which is controlled by the microcomputer 22. Various signals in FIG. 2, i.e. the interruption signal RC form blocks 2, 4 and 5, the signal RTB for indicating completion of a 1-byte data transmission, the acknowledge signal AC, and the signals BC1 to BC3 for permitting the blocks 2, 4 and 5 to use buses, will be described later in the description of operation. It should be noted that DCB and DTB represent data buses.

The operation of the microcomputer 22 for the first elevator is described below with reference to FIGS. 3 to 5.

Figure 3:
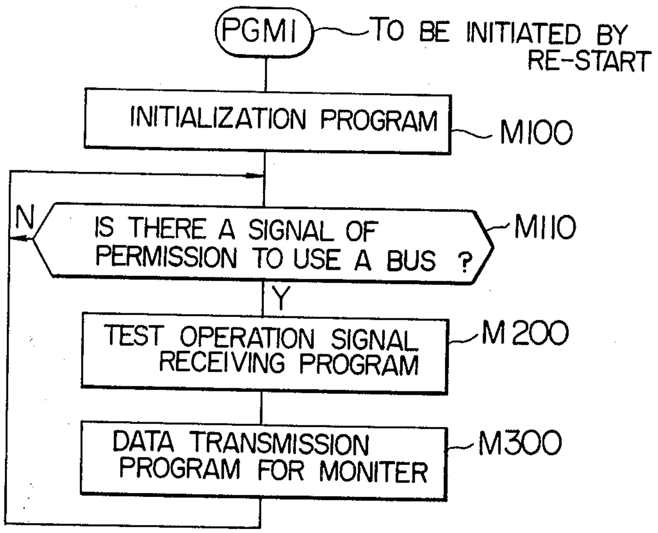
FIG. 3 shows a computer program for the elevator control signal processing computer according to the present invention by way of a flowchart of signal transfer between the computer and test device.

FIG. 3 is the flowchart of a program PGM1 for the microcomputer 22 which starts processing simultaneous with the power supply being initiated. An initialization program M100 is provided to initialize the internal register of the PIA used for the input/output interface circuit 21 and code signal interface circuit 23 and to initialize the RAM (usually, the whole area is cleared to be zero). This program also establishes a stack point.

In the next step M110, a bus allocation signal (a signal of permission to use a bus) BC1 generated by the test device 3 in FIG. 2 is utilized to determine whether the data signal bus DCB for transmitting code signals to the elevator signal control device 2 for the first elevator is ready for use or not. If the bus is ready for use, a program M200 is initiated so that the microcomputer 22 is controlled to receive the test operation signal based on the instructions supplied through the keyboard 36. A program M300 is then initiated and a monitoring data transmission program to be sent from the elevator signal control device for the first elevator to the test device 3 is processed. In these programs, if the group control device 4 is in "bus ready for use" state (i.e. BC2 is "1"), the "bus ready for use" signal BC1 for the first elevator is "0". In this condition, the step M110 produces a decision to be "No" and is maintained in a stand-by state, and these two programs perform loop processing if a "bus ready for use" signal is given. (The detail is described later.)

Figure 4:
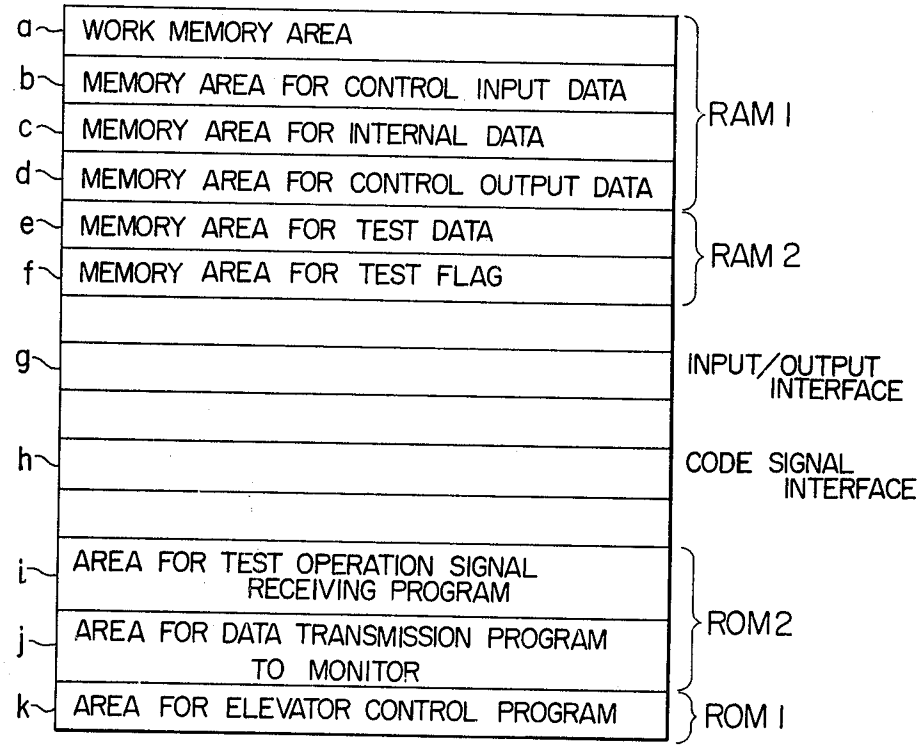
FIG. 4 shows an address map of the elevator control signal processing computer according to the present invention.

FIG. 4 shows a schematic diagram of an address map of the microcomputer 22 for the first elevator for illustrating a status of allocation to the RAM, ROM, etc.

Address areas a to k are provided in which the area a belongs to the smallest address number and the area k belongs to the largest address number.

The address area a is the work memory area used for various objects in the mathematical operation by the microcomputer 22. The address area b is adapted to store control input data from the elevator control unit 1. The address area c is an internal data memory area, which is produced from the program stored in the area k.

The address area d is an area for storing control output data to be delivered to the elevator control unit 1, which is produced from the program stored in the area k. These areas a, b, c and d are also the address areas for a first $RAM_1$ built in the microcomputer 22.

The address area e is a test data memory area for storing test operation signals transmitted from the test device 3. The address area f is a test flag memory area for storing test flag signals and the data produced from the test operation signal receiving program stored in the area i.

These areas e and f are also the address areas for a second $RAM_2$ built in the microcomputer 22. Thus, the microcomputer 22 includes two RAM's.

The address area g is a register area for the input/output interface PIA shown in FIG. 1. The address area h is a register area for the PIA for the code signal interface circuit 23 to the test device 3.

The address areas i, j and k program areas. The area i is used to receive test data and process the test data. The area j is used to transmit the data required by the test device 3 among the information stored in the first $RAM_1$. The address area k is a program area for the elevator operation. The area k is also the address area for a first $ROM_1$ built in the microcomputer 22, and the areas i and j are the address areas for a second $ROM_2$. As described above, the memories and the input/output interface circuits in the microcomputer do not permit a duplicated allocation in the same address area.

The $RAM_2$ for storing the test operation program and the code signal interface circuit 23 may be added only for test operation of elevators. Thus, the test system may be built at low cost because only a single set of circuits for test operation is provided for a plurality of elevators.

Figure 5:
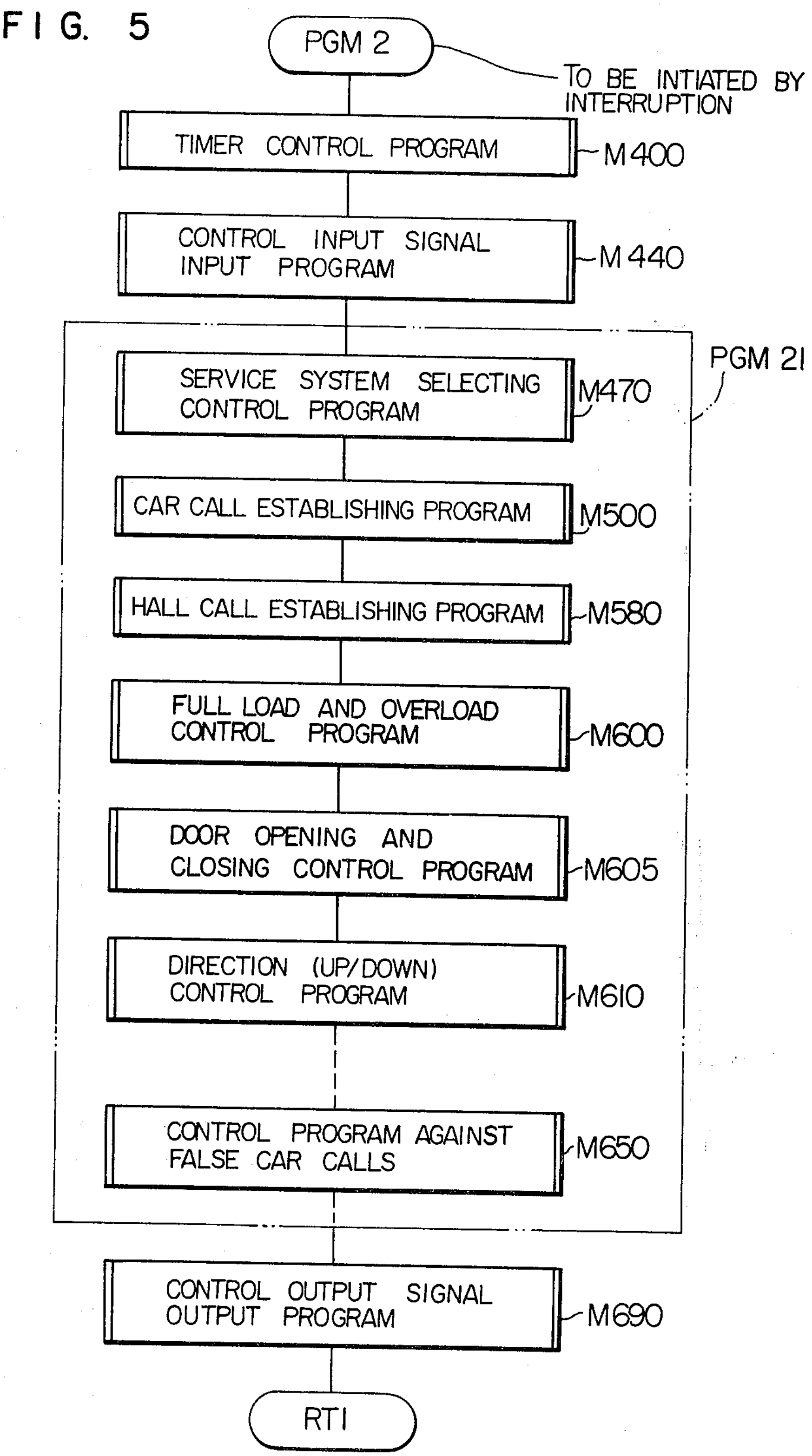
FIG. 5 shows a program for the elevator control signal processing computer according to the present invention by way of a flowchart of an elevator operation control program.

FIG. 5 is a general flowchart (hereinafter abbreviated as GFC) of the elevator operation control program $PGM_2$ initiated by an interruption pulse $CL_2$ from the interruption pulse generator 24.

When an interruption signal is supplied from an external source to the MPU in the microcomputer 22, the step M110 and programs M200 and M300 shown in FIG. 3 relative to the test device 3 stop their processing temporarily, and various registers are saved, then the program shown in FIG. 5 is executed.

First of all, the timer control program for the program M400 is executed, in which the time elapse count of the timer requested by the sequence program PGM 21 is compared with the count of the timer, thereby to conduct such a timer control as to determine that a predetermind period of time has elapsed, and to establish the timer output flag. When all timer processing is completed, a program M440 is initiated to execute the program for admitting a control input signal from the elevator control unit 1.

Next, a sequence program GPM 21 is executed. The program 21 utilizes input data such as new control input data and the internal data stored in the $RAM_1$ and $RAM_2$. In order to control typical functions of the sequence program PGM 21, seven task programs M470 to M650 are provided as shown in FIG. 5. In general, many more task programs are provided. To simplify the description, the general function of FIG. 5 will not be described, although the programs directly related to the present invention will be described in detail hereinafter with reference to FIGS. 17 and 20.

As a result of the execution of the sequence program PGM 21, i.e. by supplying the data stored in the control output data memory area d to the elevator control unit 1 with use of the program M690, control commands such as the command for lighting car response lamps and the command for opening or closing doors are issued.

The interruption program processing steps all are finished simultaneous with completion of the above-described processing. The program shown in FIG. 3 is then initiated again.

The operation of the microcomputer 32 for the test device 3 is generally described below with reference to FIGS. 6 and 7.

Figure 6:
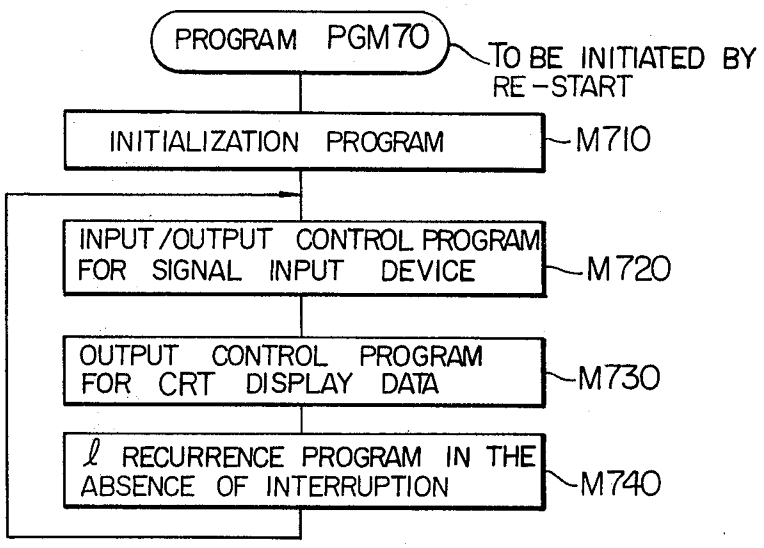
FIG. 6 shows a flowchart of a program for the test device according to the present invention.

FIG. 6 is a flowchart of a program PGM 70 which is initiated simultaneous with the power source being switched on. An initialization program M710 is provided to initialize the PIA311, the PIA312, the PIA as one embodiment of the interface circuit 35, the internal register in the ACIA37, the RAM 321, and the internal memory in the video control circuit 33. (Usually, the RAM 321 is initialized in such a manner that all its areas are cleared to "0".) Then, loop processing for programs M720 and M730 is performed. The program M720 is adapted for input/output control of the signal input device 36 which provides commands necessary for test operation of elevators, and the program M730 is adapted for output control of the data to be displayed on the cathode ray tube.

Figure 7:
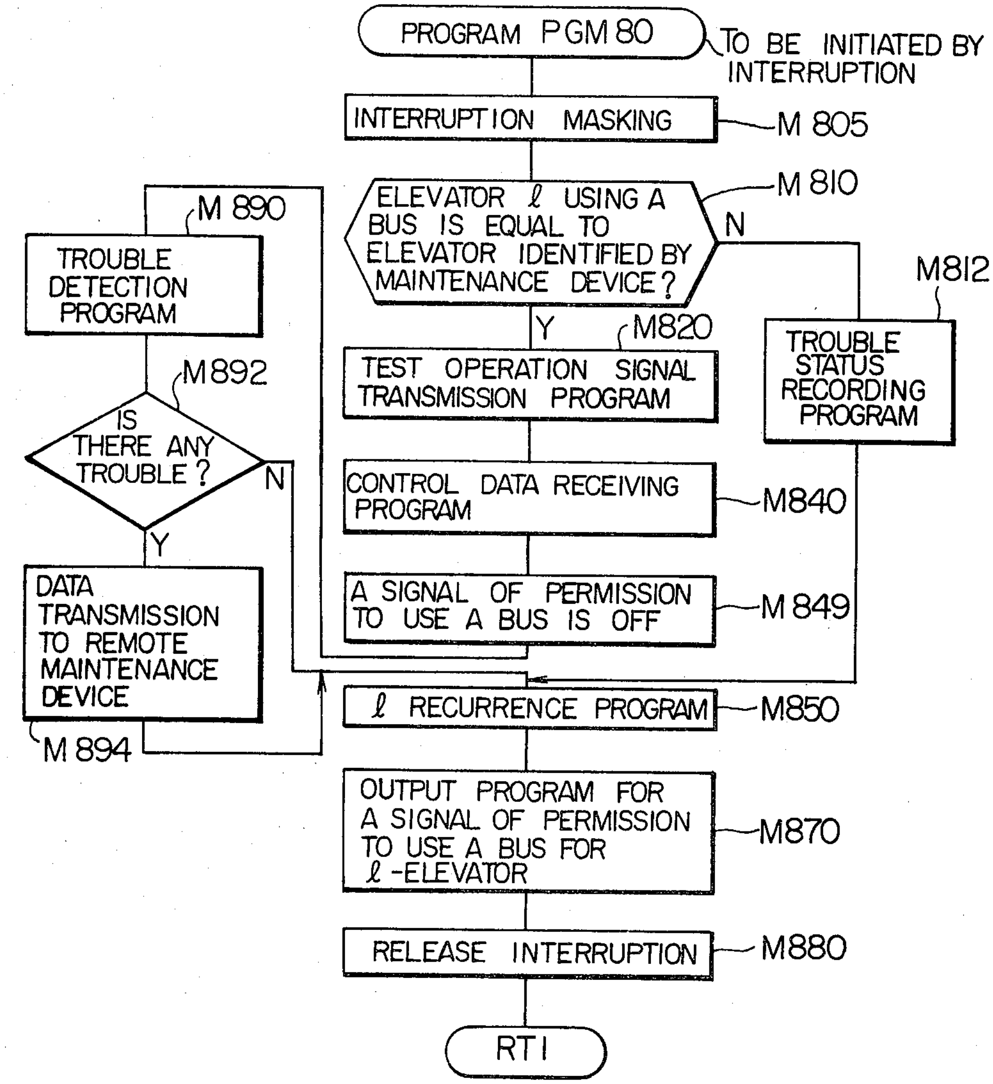
FIG. 7 shows a program for a computer for the test device according to the present invention by way of a flowchart of signal transfer between the computer and test device.

FIG. 7 shows a program PGM80 which is initiated by the interruption signal RC from the elevator control blocks 2, 4 and 5 shown in FIG. 2. This program controls signals BC1 to BC3 of permission to use a common data bus DCB, transmission of the test operation signal, reception of the control data, trouble detection, and automatic recording and alarming of the trouble detection.

Prior to a specific description of FIG. 7, the method of controlling the common data bus DCB and the general operation of the arrangement of FIG. 2 embodying the present invention will be described in conjunction with the time chart shown in FIG. 8. Symbols shown in the left side of the chart represent various signals and programs, and arrows indicate that their associated programs are in progress.

If an interruption program PGM2 for controlling operation of the first elevator is completed when the signal BC1 of permission to use a bus for the first elevator is "1", programs M200 and M300 (represented by ⓐ) is immediately executed to transfer coded signals necessary for testing and maintenance or to control the test operation of elevators by processing the test data. As soon as these programs are completely executed, the signal BC1 of permission to use a bus for the first elevator becomes "0" and the program PGM1 for the first elevator is looped in the step M110.

Since the program PGM2 is periodically initiated at time points $t_1$ and $t_2$ at which the interruption pulse CL2 rises, the microcomputer 22 smoothly controls the elevator operation at a desired rate.

Figure 8:
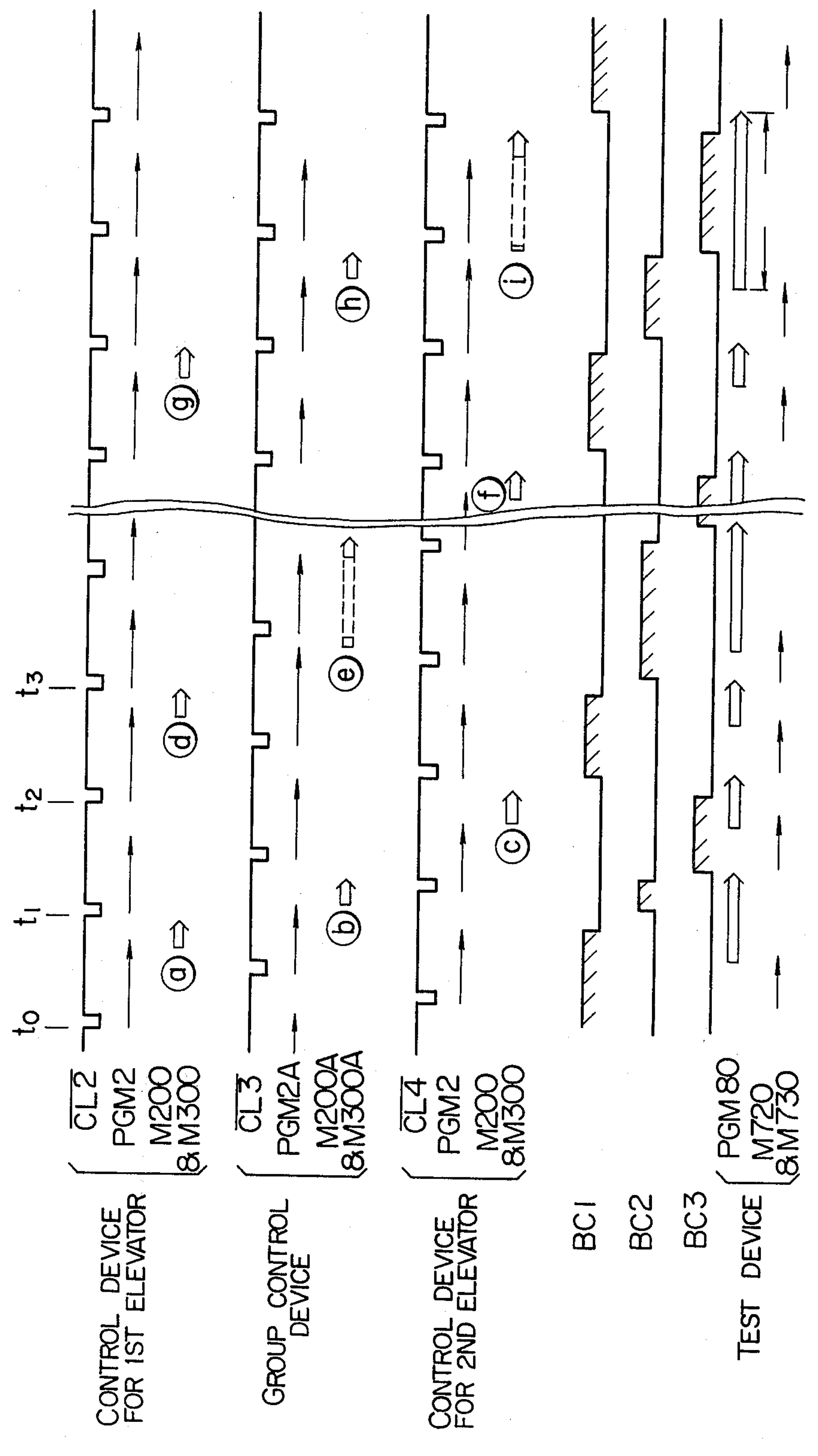
FIG. 8 shows a time chart illustrating the operation of one embodiment of the present invention.

As shown in FIG. 8, the signals BC1 to BC2 of permission to use a bus are recurrently controlled by the test device 3 in such a manner that they never overlap each other. The other control blocks 4 and 5 are also controlled in the same manner.

As shown in FIG. 8, the test device 3 loops programs M720 and M730, which are adapted to interface the input device 36 such as a keyboard and provide data to be indicated on the CRT, during the intervals in which the interruption program PGM80 is not in process.

Reference is again made to FIG. 7. Once the program PGM80 is initiated by an interruption signal RC generated by the control block 2, 4 or 5, a step M805 operates to use the signal RC as a data establish signal rather than as an interruption signal until the program PGM80 is completely executed.

Figure 10:
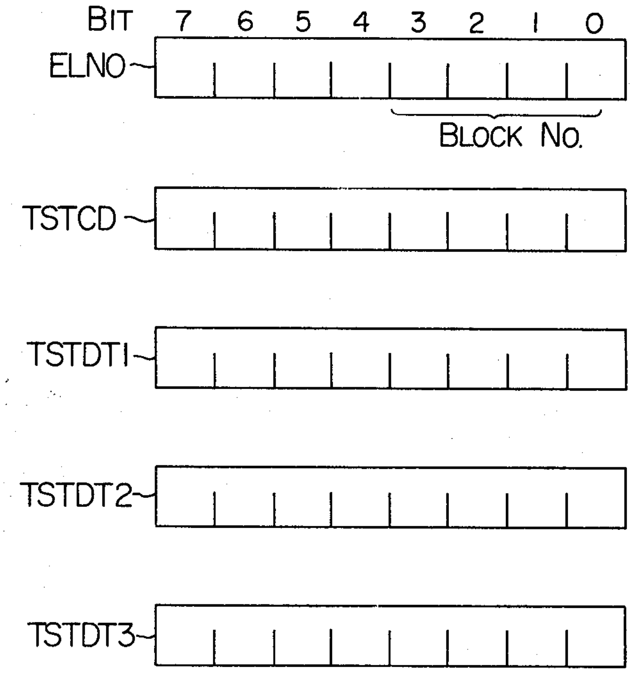
FIG. 10 shows a bit arrangement of test operation signals according to the present invention.

A step M810 is provided to check whether a block number FLNO first received as shown in FIG. 10 corresponds with the integer l representative of the block number of the control device which is generating a signal of permission to use a bus. Note that FIG. 10 shows structures of test operation signals. If the two numbers do not correspond, i.e. the decision of the step is "No", then the l and the received block number are recorded and the process jumps to a program M850 since the next block may be normal.

If the decision is "Yes", a test data transmission program M820 and a control data reception program M840 are executed by way of a handshake system with the microcomputer in an active block. After the execution of these programs have been completed, the signal of permission to use a bus is temporarily turned "OFF" by a step M849 so that the program PGM1 or other programs of the microcomputer 22 is prevented from undesirably proceeding while the test device 3 is executing programs M890 to M894 which relate to failure detection. After the rationality and safety checks of the signal received during the execution of the program M840 are performed through the program M890, the result is checked by the step M392. If a failure is found, the decision or alarm information is stored and then sent under control by the step M892, through the ACIA 37 and the modem 38 to the management room of the building or to the remote maintenance device 7 located in the associated maintenance company.

After the above processing for the block l is completed, a program M850 is executed for recurrent control of l, then an output program M870 is executed and a step M880 is executed to disable the interruption so as to prepare the test device 3 for the processing of the next block.

As shown in FIG. 6, a program M740 is added for the situation where a particular block is completely out of operation. This is an improvement and permits the next block to be processed when an interruption pulse TC does not occur for a predetermined period of time.

A test operation signal reception program M200, which is an essential part of the present invention, is described below by way of one embodiment thereof with reference to FIG. 9.

A step M202 is provided to send the test device 3 a transfer data which is the code for allowing the test device 3 to check that its own block number ELNO and the test operation signal are required to be sent, and to send an interruption signal RC "1" to initiate the interruption program PGM 80 shown in FIG. 7. In a step M204, initialization is performed for reception of five data as shown in FIG. 10 from the test device 3.

Next, steps M206 and M207 are looped to wait until the RTB which serves as a "one-byte data transmission completed" signal becomes "1".

When the one-byte data transmission completion signal RTB is supplied, the block number of the first transfer data ELNO and its own block number are checked for their identity (M208). If they are identical, monitoring steps M210 and M218 for the signal RTB are looped.

If the test device 3 sends a second received data TSTCD to the data bus DTB, the RTB becomes "1" to allow the decision of the step M210 to be "Yes" and thus the second received data is stored in the area e shown in FIG. 4 during a step M212. Then, a counter C counts up by one during a step M214. Then the counter C has a content of 1 because it is initially set to zero during the step M204. The counter C is adapted to incrementally increase its content to 1, 2 and 3 since the content is used when third, fourth and fifth received data are sequentially stored in their corresponding addresses during the step M212.

In the illustrated embodiment, the fifth received data are the final data to be received. Therefore, a step M216 decides that the counter C has reached a count of 4, and then a step M220 is initiated.

In the step M220, the test code TSTCD stored in the test data memory area e is checked and the head address of its associated program is selected. In the next step M222, the test program associated with the selected head address is executed.

It should be noted that steps M207 and M218 are provided to detect that any test data are not sent because of suspension of the testing by the test device 3 or because of a hardware or a software trouble of the test data transmission system. These steps are programmed to last for a longer period of time than the time $t_1$ in FIG. 8.

Now suppose that the test is completed and the test device 3 has been disconnected from the elevator signal control device 2 by disconnecting a detachable connector 26 comprising, for example, sockets and plugs. Then, no test data is received and thus the step M207 or M218 decides "Overtime". As a result, a step M224 is initiated to clear all the test data flags previously prepared. In this state, the signal of permission to use a bus for the separated block becomes "1" and the step M110 in FIG. 3 decides "Yes".

A step M207 decides "Overtime" if no test data is transmitted within a predetermined period of time because of a trouble of the test device 3. A step M208 decides "No" if the elevator number ELNO and its own block number are not identical. Then, a step M224 is initiated.

Since the execution of the step M224 may cause all testing functions to stop, it functionally corresponds to the situation where the test device 3 which is out of order, has automatically been removed.

Figure 9:
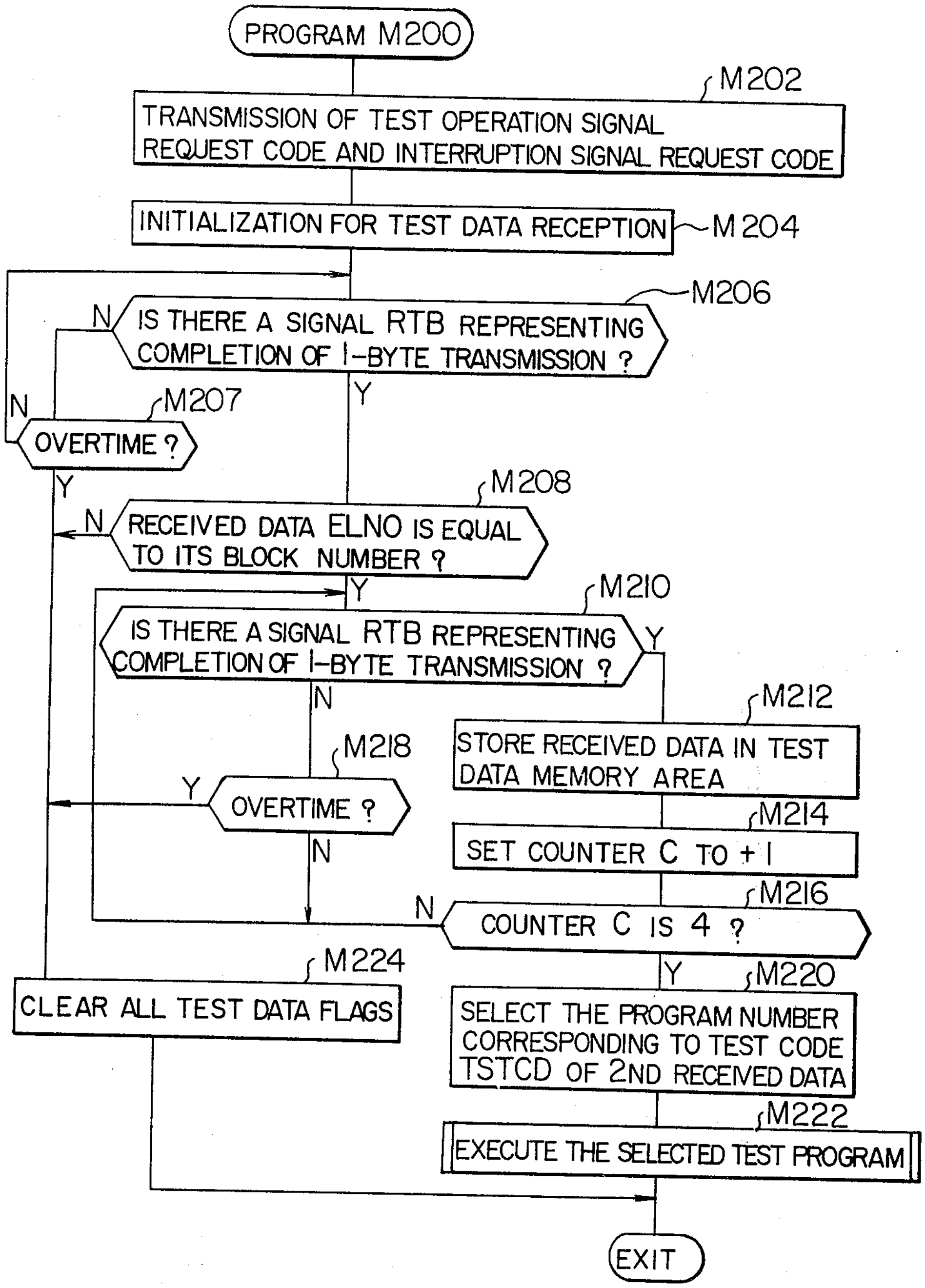
FIG. 9 shows a program for the elevator control signal processing computer according to the present invention by way of a flowchart of a test operation program.

The embodiment of the invention illustrated in FIG. 9 may substantially reduce the mutual effect between the reliability of the test device 3 and the reliability of the elevator signal control device.

This embodiment also may prevent troubles produced from a forgotten release of a command for stopping the test operation of the test device 3.

The test code TSTCD and some examples of the test functions are shown in FIG. 10 and the following Table 1.

TABLE 1

| Test code No. | Program No. | Function |
|---|---|---|
| 02 | M230 | Timer advance control. |
| 04 | M240 | Controls of car call set and all set. |
| 06 | M250 | All clear control of car calls. |
| 08 | M260 | Sequential setting control of car calls. |
| 10 | M270 | Car weight setting control. |
| 12 | | Door actuation control. |
| 14 | | Elevator rated speed limiting control. |
| 16 | | Direction (up/down) control. |
| 18 | | Service operation system setting control. |
| 20 | | Controlled-operation system setting control. |

Referring to FIGS. 11 to 15, description will be made herein about particular examples of test programs from the test code 02, M230 "Timer advance control" through the test code 10, M270 "car weight setting control". Other test programs may be provided in the same way, but they will not specifically be described herein.

It should be noted that the kinds of information indicated by the test data entering from the third received data to the fifth received data shown in FIG. 10 depend on the test data. If there are more than twenty floors to be served, more test data are needed and the decision numeral of the step M216 in FIG. 9 may be increased properly than 4.

The length of data to be received may be varied according to the test code TSTCD. Part of the test code may be independently separated. A code indicative of the data length may be added to both ends of the test code. These modifications are easily obtained.

In such cases, the decision numeral 4 of the step M216 is variable instead of 4 in the illustrated embodiment, and some change in the flow shown in FIG. 9 is necessary, as apparent to those who are skilled in this field of art.

Timer advance control is described in detail below with reference to FIGS. 11, 16 and 17.

Figure 11:
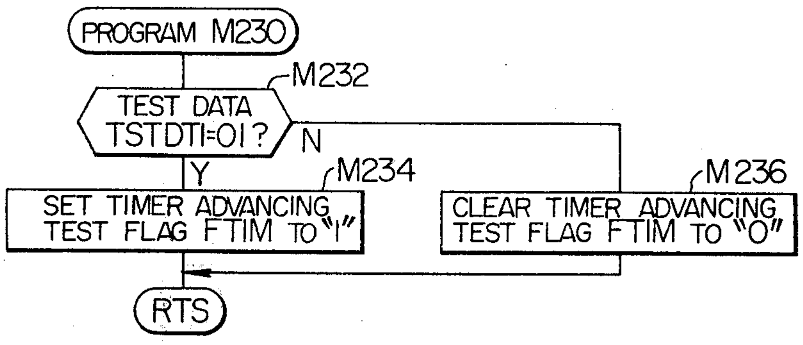
FIG. 11 shows a program for the elevator control signal processing computer according to the present invention by way of a flowchart of a test operation program for shortening a period of time when an elevator door is opened.

A test program M230 shown in FIG. 11 is used for the timer advance control. This test program is initiated by the step M222 shown in FIG. 9 when the value of the second received data TSTCS is 02.

A step M232 decides as to whether the value of the first test data $TSTDT_1$ is 01 or not, so as to issue a test command for initiating the timer advance control or a test command for stopping the timer advance control.

If the decision by the step M232 is "Yes" ($TSTDT_1=01$), a step M234 sets a timer advance test flag FTIM to "1".

If the decision is "No", on the other hand, a step M236 clears the timer advance test flag FTIM to "0".

As previously described, the execution of the program in the step M224 in FIG. 9 also clears the test flag FTIM to "0".

Thus, the test flag FTIM controlled by the test data reception program M200 is used to determine whether the timer advance control should be made in a timer control program M400.

A general description of timer control will be made below for better understanding of the timer control program M400 shown in FIG. 17.

As can be seen in FIG. 8, the timer control program M400 is initiated at every period of each interruption pulse CL 2. If interruption pulses occur at 10 ms intervals, the timer control program forming part of the program PGM 2 is initiated at every 10 ms. Now, assume that the MPU of the microcomputer 22 uses an 8-bit system and that a byte (8-bits) is used as an internal data register for a sequence timer counter. Then, the maximum delay obtained is $2^8\times10$ ms$=256\times10$ ms$=2.56$ seconds. The maximum display time makes it impossible to make a long-time timer such as timers which count an automatic door closing period of time, an automatic M-G stopping period of time, a period of time for keeping a door opened, and a period of time for ending compensation for rope expansion; a clock timer; and a timer for sampling the traffic.

Those timers include a timer desirable to be advanced in accordance with a command from the test device 3 (including all of the above-mentioned seven cases), a timer undesirable to be advanced for safety, for example, a $Y-\Delta$ switching period of time of $M-G$, and a less than a second timer incapable of increasing the test efficiency even if the timer is advanced.

Taking into consideration the above two situations, the arrangement according to one embodiment of the present invention includes two kinds of 1-byte reference pulse registers for timer PTMA and PTMB. In a program M418 shown in FIG. 17, the count of each sequence timer selects an arbitrary pulse from reference pulses, and if the pulse is "1" the sequence timer counts up, while if the pulse is "0", the count of the sequence timer is kept unchanged.

In this arrangement, only the reference pulse register PTMB is arranged so that the pulse interval is shortened to 1/32 in accordance with the instructions by the timer advance test flag. Therefore, the sequence timer which requires timer advance uses pulses of the register PTMB as reference pulses.

For example, a 60-second sequence timer A is programmed to provide a "1" output after counting 64 reference pulses of 0.64 ms (described later) stored in the zero bit of the register PTMB.

Such a 60-second timer starts operating in about two seconds after being actuated by the timer advance test function, thereby speeding up the sequence check.

Figure 16:
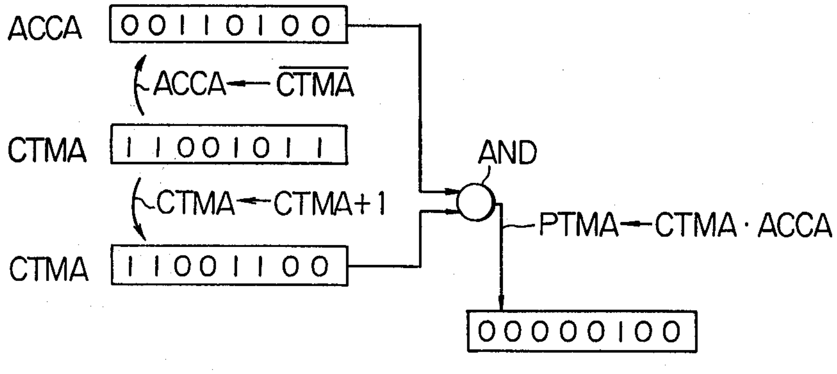
FIG. 16 shows the counting operation of the timer counter for the elevator control signal processing computer according to the present invention.
Figure 17:
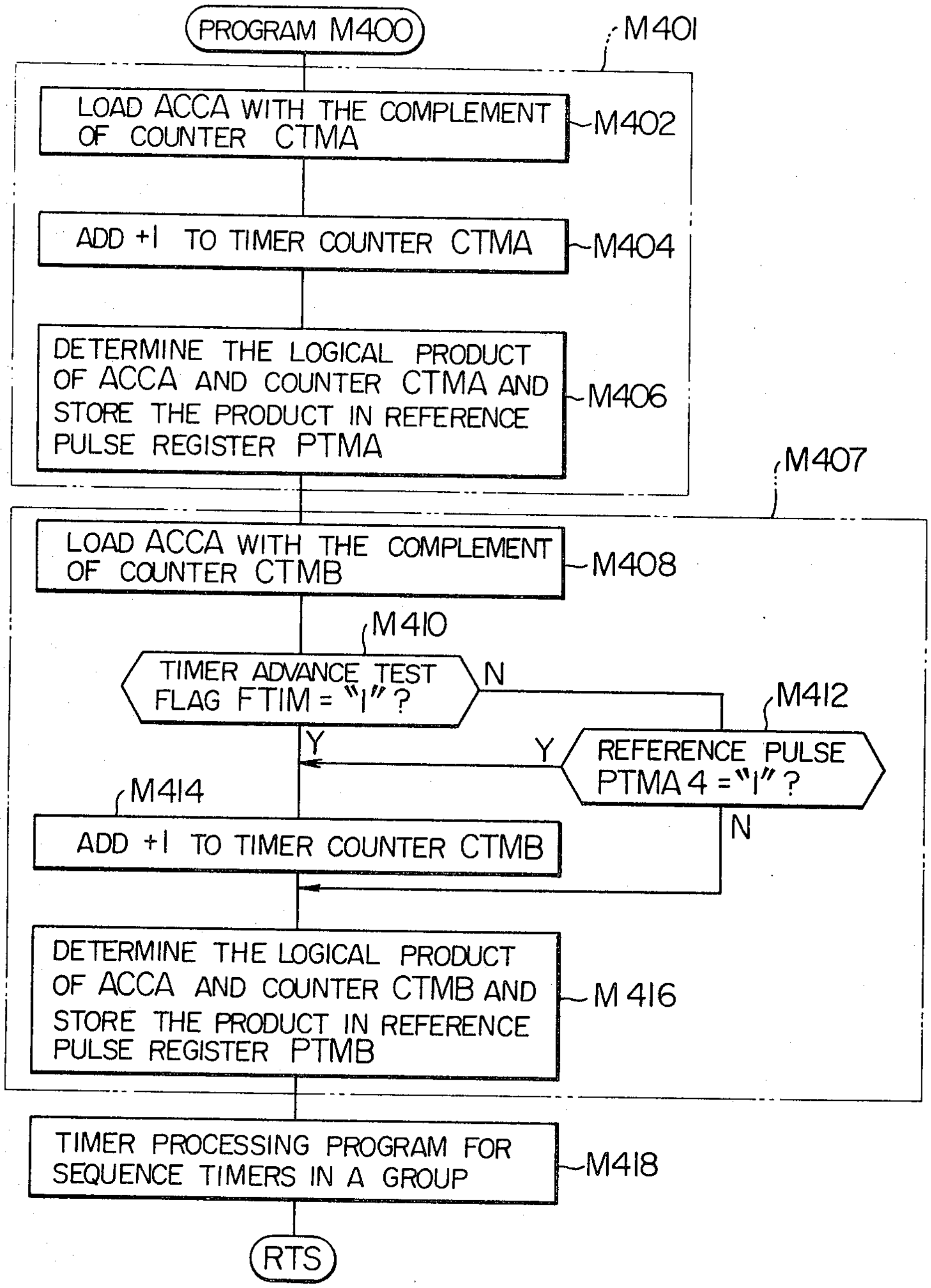
FIG. 17 shows a program for the elevator control signal processing computer according to the present invention by way of a flowchart of a timer control program.

FIG. 16 illustrates a specific operation of a program M401 for producing the reference pulse PTMA.

In the first place, an ACCA (accumulator A) is loaded with a counter CTMA or internal data, in accordance with a step M402, and its complement is also taken. That is, a process ($ACCA\leftarrow\overline{CTMA}$) as shown in FIG. 16 is performed.

The counter CTMA is counted up by one in accordance with a step M404. That is, a process ($CTMA\leftarrow CTMA+1$) is performed.

Then, the logical product of the ACCA and the counter CTMA is obtained for each bit in accordance with a step M406, and the resultant is stored in the reference pulse register PTMA. That is, a process ($PTMA\leftarrow CTMA.ACCA$) is performed.

According to a program M407, the register PTMB is also produced basically through the same procedure as above.

In brief, the reference pulse register bit corresponding to that bit of the counter bits which has changed from "0" to "1" becomes "1" only during a period of 10 ms in which the program M400 is executed.

The program M407 is different from the program M401 in that it additionally includes steps M401 and M412. Other steps M408, M414 and M416 are processed in the same manner as the program M401.

The step M410 decides whether the above-mentioned test flag FTIM has been turned to "1" by the timer advance instructions.

If the test flag is "0", the decision of the step M410 is "No", then the reference pulse PTMA 4 of the fourth bit of the reference pulse register PTMA is determined in accordance with the step M412. If the test flag is "1", the step M414 is initiated to count the counter CTMB upward by one. When the test flag is "0". the value of the counter CTMB is maintained and every bit of the register PTMB is turned to "0" in the step M416.

Therefore, the reference pulse PTMB 0 in the zero bit of the reference pulse register PTMB has a pulse separation of 640 ms ($2\times2^{1+4}\times10$ ms).

Since the program M401 is initiated every 10 ms and reference pulse are additionally produced from detection of leading edges of pulses, the pulse separation of the reference pulse PTMA 0 is 20 ms ($2\times10$ ms). Therefore, the reference pulse PTMA 4 has a pulse separation of 320 ms ($2\times2^4\times10$ ms).

On the other hand, if the test flag FTIM is turned to "1" in response to the timer advance instructions, the step decides "Yes". Then, the counter CTMB counts up for each pulse as in the reference pulse register PTMA program M401, and accordingly the pulse separation of the reference pulse PTMB 0 is reduced to 20 ms from 640 ms.

Therefore, of the sequence timers controlled by the step M418, those which use reference registers PTMB as the reference pulse operate at the rate of 1/32 timer interval, and this improves the sequence check efficiency for maintenance. For example, by shortening the elevator-door opening and closing interval, the elevator stop time may be reduced and the efficiency of test operation is improved.

Figure 12:
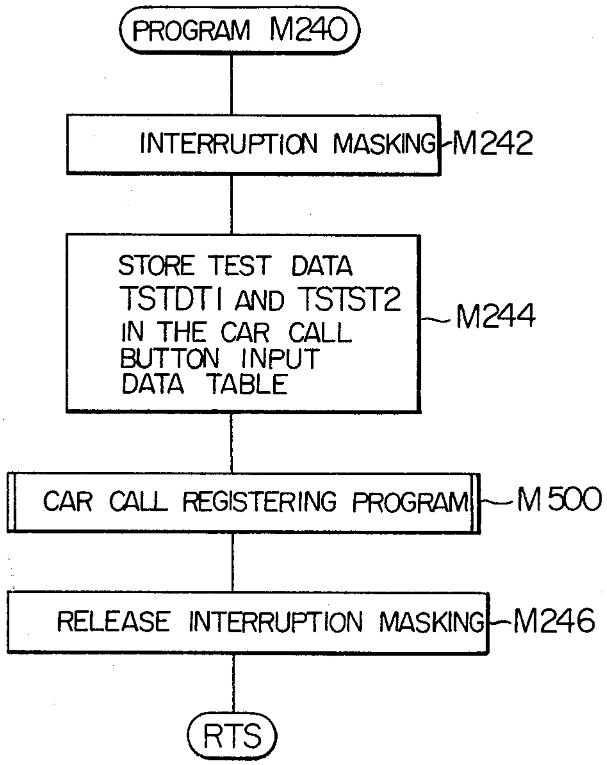
FIG. 12 shows a program for the elevator control signal processing computer according to the present invention by way of a flowchart of a test operation program for establishing an elevator car weight.

A test program M240 for car call setting control will be discribed with reference to FIG. 12.

As indicated in Table 1, the test program M240 shown in FIG. 12 is initiated when the value of the second received data TSTCD is 04. In order to prevent interruption of the test program, interruption masking is peformed according to a step M242 so as to prevent an interruption pulse CL 2 from interrupting the test program. (The reason will be described later.) Then, test data $TSTDT_1$ and $TSTDT_2$ are stored in the car call button input data table in accordance with a step M244. The next step uses a subroutine (described later) of a car setting program forming a part of the elevator control program PGM 2 shown in FIG. 5, and the subroutine is initiated.

In this step, some or all of the car calls are set by the test data signal sent from the test device 3.

A step M246 is provided to disable the interruption masking so that the program PGM 2 is ready to be initiated.

In this embodiment, the car call setting test data is stored in the address for storing the control input data from the car call button and is processed by utilizing a part of the elevator control program PGM 2.

If the program is initiated by an interruption during this test process, the test data will be destroyed by the program M440. In order to avoid this, the step M242 is provided to hold interruption for a short time.

A test for canceling the car call setting is described in detail with reference to FIGS. 13 and 19.

Figure 13:
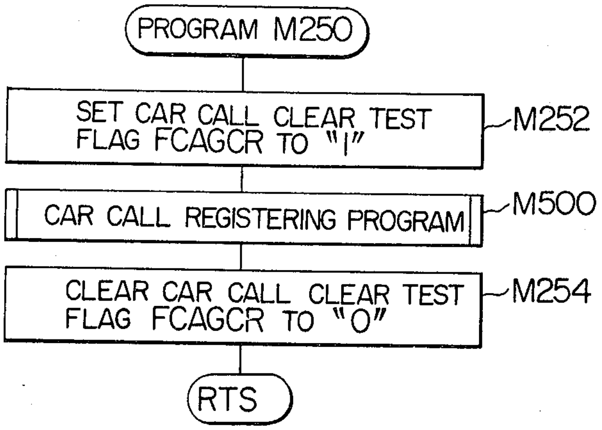
FIG. 13 shows a program for the elevator control signal processing computer according to the present invention by way of a flowchart of a test operation program for canceling car calls.

A test program M250 shown in FIG. 13 is initiated by the step M222 shown in FIG. 9 when the value of the second received data TSTCD is 06.

In a step M252, a test flag FCRGCR for clearing all car calls is set to "1". In the next step, a subroutine M500 is initiated. Thus, all car calls are cleared because the test flag FCRGCR is "1".

In the next step M254, the test flag FCRGCR is returned to "0", so that if the subroutine is thereafter initiated by the program PGM 2, the test for canceling all car calls is not performed.

Figure 19:
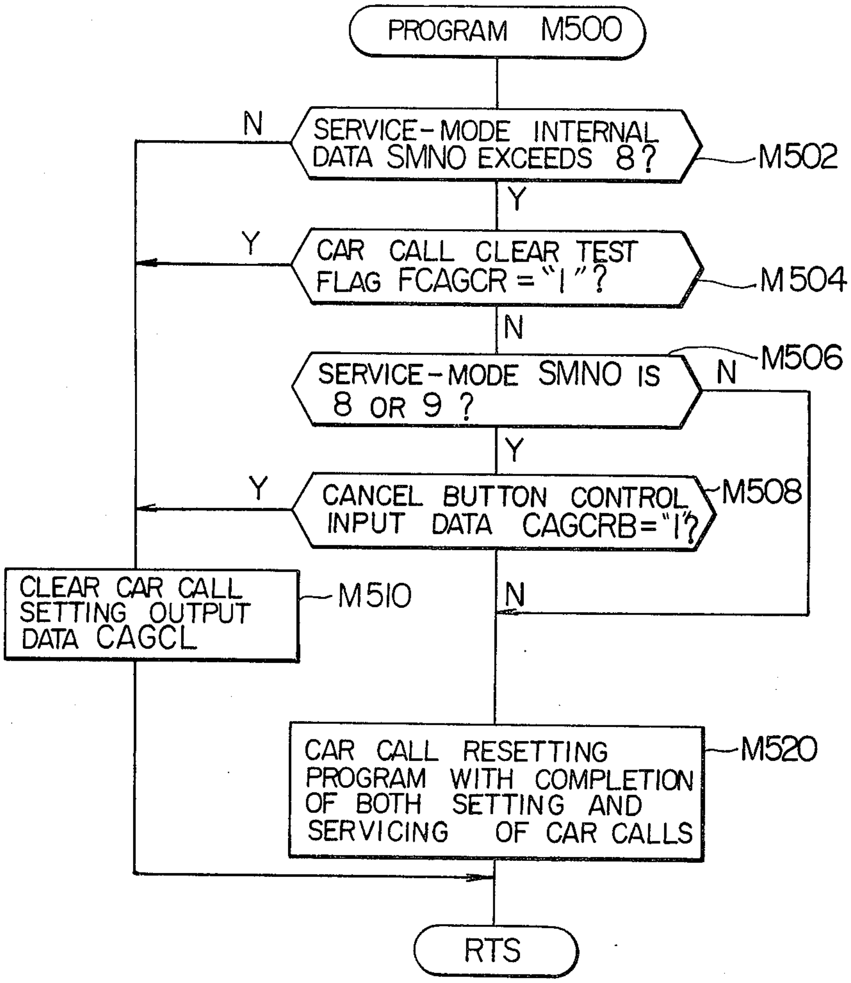
FIG. 19 shows a program for the elevator control signal processing computer according to the present invention by way of a flowchart of a program for setting up car calls.

FIG. 19 is a flowchart illustrating in detail the car call setting program M500 in the form of a subroutine.

A first step M502 decides whether 8 is exceeded by the value of a service mode SMNO which is the internal data produced by the service system selection program M470 shown in FIG. 5.

Table 2 shows an example of the relation between the values of the test mode SMNO and the service systems. The flow of M470 will not be described in detail because these service systems are well known.

TABLE 2

| SMNO | Service system |
|---|---|
| 0 | Power off. (power saving condition) |
| 1 | Emergency stop. |
| 3 | Maintenance operation on car. |
| 4 | Maintenance operation within car. |
| . | |
| . | |
| . | |
| . | |
| . | |
| 7 | Automatic landing operation. |
| 8 | Manual operation. |
| 9 | Private operation. |
| . | |
| . | |
| . | |
| . | |
| 12 | Automatic operation. |
| . | |
| . | |
| . | |
| . | |

As seen from the above, setting car calls by destination buttons in a car and service of the set calls are performed only when the service mode number SMNO is higher than 8. The step M502 utilizes this to decide rapidly whether there is car call service or not.

If the service mode number is lower than 8, the step M502 decides "No" and a step M510 is initiated to clear the car call setting output data, which is located in a part of the output table area, to "0".

If the service mode number is higher than 8, the decision is "Yes" and a step M504 is initiated to decide whether the car call clear test flag FCAGCR controlled by the test program M250 shown in FIG. 13 is "0" or "1". Usually, the test flag is "0" and thus the decision is "No". Then, a step M506 is initiated to decide whether another step M508 is to be executed or not. The step M508 is provided to determine the presence of the control input data CAGCRB to the car call canceling button mounted on the operation panel in a car. In order to prevent the step M508 from being undesirably executed, the car call canceling button is adapted to operate only when the service mode SMNO is 8 or 9.

In the embodiment shown in FIG. 19, the car call canceling button is effective only during operator's manual operation when the service mode number SMNO is 8 or during transportation of goods by a particular user when the service mode number SMNO is 9. Therefore, in such a situation, the step M506 decides "Yes" to initiate a step M508. If the canceling button is not depressed, however, the decision is "No" and a step M520 is initiated. The step M520 is adapted to execute a program for setting car calls and resetting the car calls which have already been serviced.

A sequential car call setting test will be described below with reference to FIGS. 14 and 18.

Figure 14:
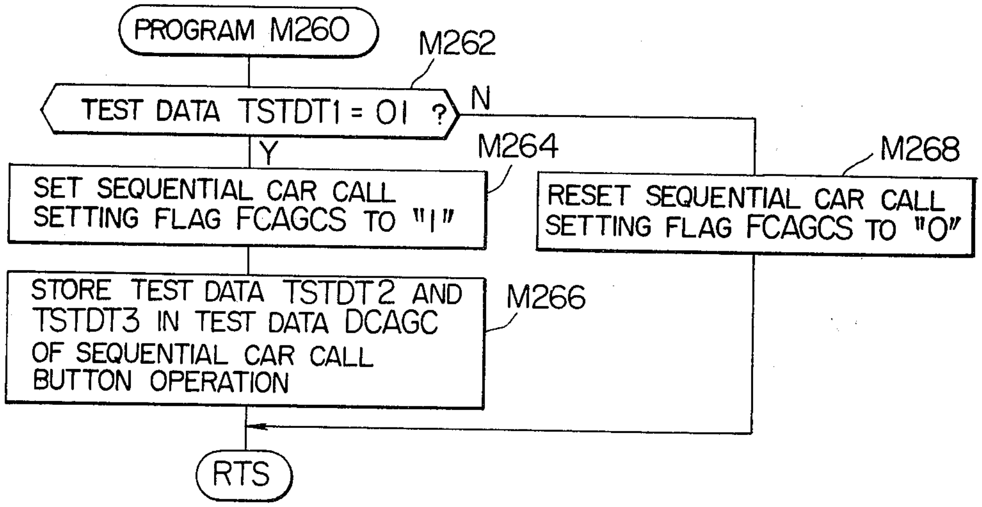
FIG. 14 shows a program for the elevator control signal processing computer according to the present invention by way of a flowchart of a test operation program for sequentially setting up car calls.

FIG. 14 shows a test program M260 for sequentially setting car calls. The test program M260 is initiated by the step M222 shown in FIG. 9 when the value of the second received data TSTCD is 08. The step M262 determines whether the first data $TSTDT_2$ which is the third received data has a value of 01 or not, and the step M262 decides a step to be next initiated, i.e. a step M264 for setting the sequential car call setting flag FCAGCS to "1" or another step M268 for resetting the flag to "0".

If the first test data $TSTDT_1$ is 01, a step M264 and then a step M266 are initiated, and the second and third test data $TSTDT_2$ and $TSTDT_3$ are stored in the memory areas of the car call test data DCAGC. These test data $TSTDTL_2$ and $TSTDT_3$ represent the floors of the car calls which is described to be sequentially set.

By way of these test data and test flags, the sequential car call setting will be described with reference to FIG. 18.

Figure 18:
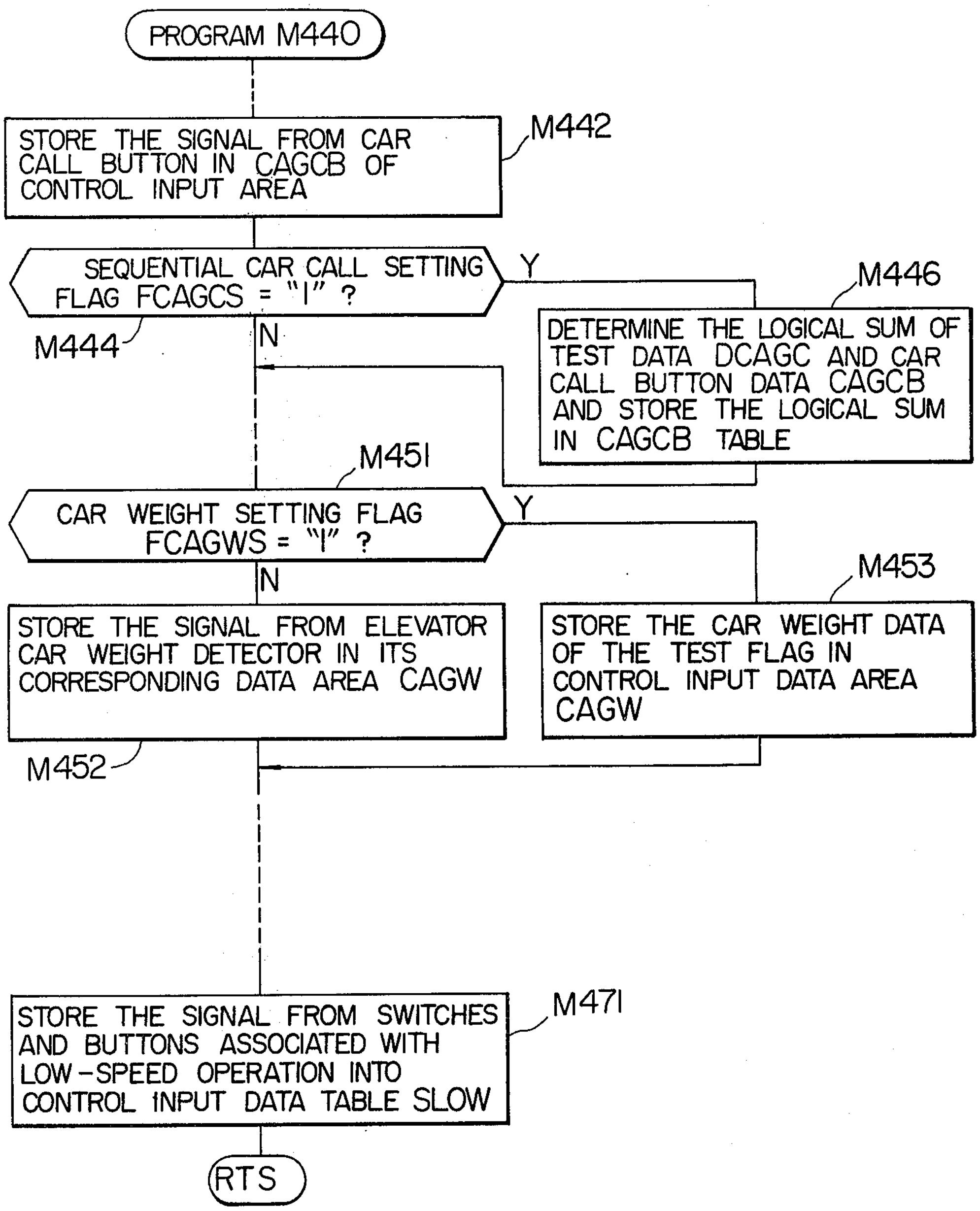
FIG. 18 shows a program for the elevator control signal processing computer according to the present invention by way of a flowchart of a control signal input program.

FIG. 18 shows a part of the control signal input program M440 which is included in the elevator control program PGM 2 shown in FIG. 5.

A step M442 is provided to store the control input signal from the car call buttons in the car call button input data area CAGCB.

A step M444 decides whether the sequential car call setting flag FCAGCS is "1". If the decision is "1", a step M446 is initiated. In the step M446, the logical sum of the car call test data DCAGC and the car call button input data CAGCB stored during the step M442 is obtained and stored in the CAGCB table.

Once the test flag FCAGCS is set to "1", the car call for the floor stored in the test data DCAGC will be set to "1" each time the elevator control program PG 2 is initiated, and thus these car calls will be set sequentially.

To conclude the sequential car call setting test, a proper command is supplied through the keyboard 36, and in response to this command the microcomputer 32 provides 08 as the test code number TSTCD and 02 (or any other value than 01) as the first test data $TSTDT_1$ to be next sent.

Figure 15:
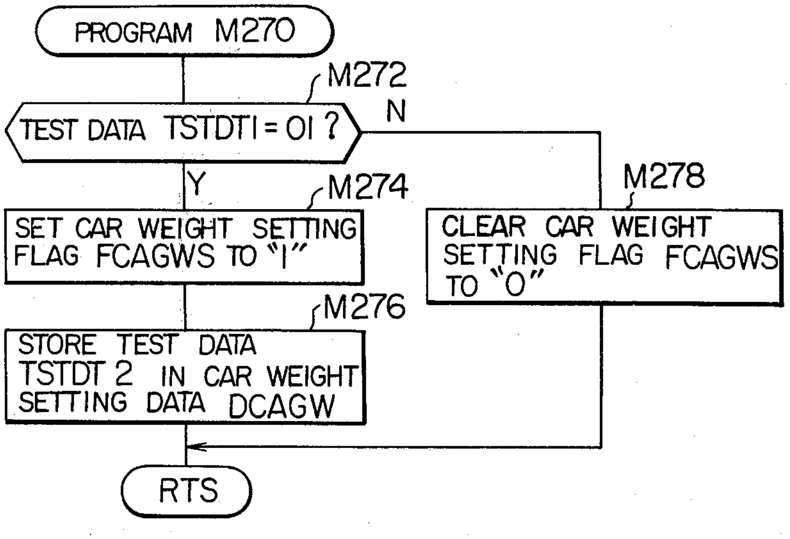
FIG. 15 shows a program for the elevator control signal processing computer according to the present invention by way of a flowchart of a test operation program for establishing an elevator car weight.

The car weight setting test will be described with reference to FIGS. 15 and 18. A test program M270 shown in FIG. 15 is initiated by the step M222 shown in FIG. 9 when the numerical value of the second received data TSTCD is 10.

A step M272 determines whether the first test data $TSTDT_1$ has a numerical value of 01 and decides a step to be next initiated, i.e. a step M274 for setting the car weight setting flag FCAGWS to "1" or another step M278 for resetting the flag to "0".

If the first test data are 01, a step M274 and then a step M276 are initiated and the second test data $TSTDT_2$ is stored in the car weight setting test data DCAGW.

The car weight setting test data DCAGW and the flag FCAGWS, once stored, are maintained until they are canceled or until other test data is supplied.

The above car weight setting flag and test data are used in steps M451 nd M453 shown in FIG. 18.

When the numerical value of the setting flag FCAGWS is 01, the step M451 decides "Yes" and the test data DCAGW is stored in the control input data area CAGW. On the otherhand, if the keyboard of the test device is operated to reset the flag FCAGW to "0", the step M451 decides "No". Then, a step M452 is initiated, and the signal representative of the car weight, provided by the weight detector in the elevator car, is stored in the control input data area CAGW.

This car weight input data CAGW is used in a full load or overload detecting program M600 shown in FIG. 5. When the numerical value of the input data CAGW is relatively large, the program M600 decides a full load to neglect new hall calls or to light a full load lamp. If the numerical value is excessively large, an overload detection is performed, so as to make an alarm buzz in the car and/or preventing the door from closing.

A control program M650 against false calls is provided to compare the numerical value of the car load input signal data CAGW (substantially proportional to the number of passengers) with the number of the car calls set. The program M650 then decides the presence of false calls if there are too many car calls for the current car weight, in order to make an alarm buzz and/or cancel such false car calls.

Thus, during a control process base on the car weight or a maintenance process for the elevator control system, the car weight can be readily set by means of the keyboard of the test device without handling as heavy a weight at 1,000 kg so many times. This may improves the efficiency of a maintenance process.

A step M471 shown in FIG. 18 is a particular step in which the operation by the test device is not permitted in the respect of safety.

Although one embodiment of the present invention has been described in detail, various modifications may be possible as described below.

In the embodiment shown in FIG. 1, signal transfer lines DL 3 and DL 4 for the control portion and the elevator control are represented by separate lines from the signal transfer line DL 1 for test data. However, the signals on the lines DL 3 and DL 4 may be transferred through the signal line DL 1 if the signal line DL 1 is controlled in a proper manner such as bus splitting control.

For two kinds of test device 3, e.g. a monitoring terminal unit and a testing unit, may be provided. In the usual operation, the test device 3 may be used as a monitoring terminal unit for interconnecting the elevator signal control device and the remote maintenance device thereby to conduct the control for the long distance signal line DL 2 using the usual subscriber's lines, coding for compression of data transfer signals, the coding control, the temporal storage of the trouble determination signal and the status signal and the control for starting the transmission to the remote maintenace device.

As described above in detail by way of the embodiments, the present invention makes it, possible to very easiy conduct various test operations for the elevator which is provided with a digital computer and therefore could not be tested adequately in the past, so that an inexpensive test operation apparatus may be provided. Thus, according to the present invention, it is possible to perform a high precision test for a short period of time, and besides the adjustment, inspection and maintenance operations of the elevator are remarkably easily performed.

What we claim is:

1. An elevator test operation apparatus for a multi-floor service elevator, comprising:

a digital computer for processing a signal from an elevator control system in accordance with an elevator operation control program to operate said elevator;

first interface means for transferring the signal from said elevator control system to said digital computer; and second interface means for transferring a signal from said digital computer to said elevator control system, wherein the improvement comprises test operation control means built into said digital computer for executing the test operation of said elevator, and means connected to said digital computer through detachable connector means for generating a test operation signal for actuating said test operation control means.

2. An elevator test operation apparatus according to claim 1, wherein said test operation control means comprises test operation program execution means for executing a test operation program in response to said test operation signal, and means for storing said test operation program.

3. An elevator test operation apparatus according to claim 2, wherein said test operation signal includes a plurality of kinds of test operation commands, and wherein said test operation program execution means includes means for executing a plurality of kinds of test operation programs corresponding to said plurality of test operation commands.

4. An elevator test operation apparatus according to claim 3, wherein said test operation signal is a coded signal, and wherein said test operation programs include programs for decoding said coded test operation signal and said test operation program execution means includes means for initiating the test operation program associated with each coded test operation signal.

5. An elevator test operation apparatus according to claim 2, wherein said elevator control signal processing digital computer includes means responsive to a timer interruption for first executing said elevator control program and thereafter to execute said test operation program.

6. An elevator test operation apparatus according to claim 1, wherein said test operation signal includes commands for changing time intervals in the operation of the elevator by said digital computer, and wherein said test operation control means includes means for changing said time intervals in accordance with said commands for changing time intervals.

7. An elevator test operation apparatus according to claim 6, wherein said commands for changing time intervals include a command for shortening a period of time when an elevator door is opened, and wherein said test operation control means includes means for shortening the period of time when the elevator door is opened in response to control by said digital computer.

8. An elevator test operation apparatus according to claim 1, wherein said test operation signal includes a command for establishing calls which will result in said digital computer causing the elevator to stop at a selected position, and wherein said test operation control means includes means for establishing such calls in accordance with said command for establishing calls.

9. An elevator test operation apparatus according to claim 1, wherein said test operation signal includes a command for canceling set calls which would have resulted in said digital computer causing the elevator to stop at a selected position, and wherein said test operation control means includes means for canceling such set calls in accordance with said command for canceling set calls.

10. An elevator test operation apparatus according to claim 1, wherein said test operation signal includes a command for sequentially establishing calls which will result in said digital computer causing the elevator to stop at successive selected positions, and wherein said test operation control means includes means for sequentially establishing such calls in accordance with said command for sequentially establishing calls.

11. An elevator test operation apparatus according to claim 1, wherein said test operation signal includes a command for establishing an elevator car weight which will result in said digital computer establishing the weight of the elevator car, and wherein said test operation control means includes means for establishing such an elevator car weight in accordance with said command for establishing an elevator car weight.

12. An elevator test operation apparatus according to claim 1, wherein said test operation signal is a coded signal which includes test codes for indicating the kinds of tests and test data for indicating specific contents of the test indicated by each test code.

13. An elevator test operation apparatus according to claim 1, wherein interface means for transferring said test operation signal to said elevator control signal processing digital computer is provided on the side of the elevator system.

14. An elevator test operation apparatus according to claim 1, wherein both said test operation control means and said test operation signal generator means are detachably interconnected by means of a detachable connector.

15. An elevator test operation apparatus according to claim 14, wherein said test operation control means includes means for determining that the function of said test operation signal generator means has stopped, and means responsive to said determining means for changing said test operation control condition to the usual operation.

16. An elevator test operation apparatus according to claim 15, wherein said determining means includes means for detecting that said test operation signal generator means has not generated any signal for a predetermined period of time.

* * * * *